Patented Dec. 25, 1945

2,391,621

UNITED STATES PATENT OFFICE 2,391,621

METHOD OF COATING PAPER

George M. Powell, III, South Charleston, and William H. McKnight, Charleston, W. Va., assignors to Carbide and Carbon Chemicals Corporation, a corporation of New York No Drawing. Application September 17, 1943,
Serial No. 502,816

1 Claim. (Cl. 117—65)

This invention pertains to the coating of paper with a composition which includes both vinyl resins and waxes.

The coating of papers of different kinds with compositions containing vinyl resins has been proposed previously as a means for improving the imperviousness of the paper to water, grease and other materials; as a method for enabling the paper to be joined to itself or other surfaces by heat sealing; and as a means for increasing the flexibility and resistance to cracking of the paper when subjected to the creasing encountered in wrapping and packaging operations. To increase the moisture resistance and to increase the abrasion resistance by decreasing the coefficient of friction of such coatings, waxes have been compounded with the vinyl resins. This has usually been done by dissolving the wax and the resin in a solvent mixture to produce lacquer-like compositions. Difficulty has been encountered, however, in obtaining adhesion of sufficient strength and permanency of the films deposited from such solutions, particularly to papers which have a hard and substantially non-porous surface, such as glassine. This difficulty increases if more than about 2% of wax is sought to be incorporated in the resin coating because the lack of adequate compatibility of the resin with these amounts of wax usually results in further loss of adherence.

This difficulty has been partially overcome and reasonably adherent, glossy coatings obtained by applying the vinyl resins and the waxes as a non-homogeneous deposit to the paper, and subjecting the coated paper to a very rapid baking operation at 375° to 400° F. This process suffers from the disadvantage that special ovens are required to obtain these high temperatures of baking. Also, even at this high baking temperature, the adhesion of the vinyl resin and wax coating to non-porous papers is not wholly satisfactory, particularly where the coated paper must withstand considerable handling.

It has been found that adherent, abrasion-resistant, glossy coatings may be obtained without resort to high baking temperatures by including a different type of vinyl resin in the coating. The composition of this invention requires a baking temperature of only 225° to 275° F., so that the usual type of steam-heated ovens may be employed. Where ovens designed for operation at higher temperatures are available, however, such ovens may be employed.

The types of vinyl resins to which this invention is applicable are those formed by the copolymerization of vinyl halides, vinyl esters of lower fatty acids, such as acetic, propionic and butyric acids, and the aliphatic, alpha, beta-olefinic carboxylic acids. Thus, the copolymers contain three components. The copolymerization reaction may be carried out in the absence of any solvent or diluent, or the monomers may be dissolved in solvents or emulsified in water prior to polymerization. The temperature may be between 30° and 80° C., and oxygen-yielding catalysts, such as hydrogen peroxide, benzoyl peroxide, and potassium persulphate may be employed. Certain alpha, beta-olefinic carboxylic acids, such as maleic acid, copolymerize at a faster rate than the vinyl halides and vinyl aliphatic esters. In such instances, allowance for this can be made by adjusting the charging ratio of the monomers, or by adding the maleic acid in small amounts during the polymerization.

The aliphatic, alpha, beta-olefinic carboxylic acids all contain the resinophoric group

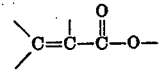

and the term "acids" also includes the anhydrides of the acids. The acids may be either monobasic or polybasic. Examples of suitable acids include maleic acid, fumaric acid, mono-esters of fumaric and maleic acids, maleic anhydride, acrylic acid, α-methacrylic acid, crotonic acid, citraconic acid and its anhydride, itaconic acid and its anhydride, chlormaleic acid and the like. Examples of mono-alkyl esters of maleic and fumaric acids include mono-methyl fumarate, mono-2-ethylhexyl maleate, mono-butyl maleate, and mono-ethyl maleate.

The amount of the alpha, beta-olefinic carboxylic acid which need be combined in the modified copolymers is not large in order that adherent coatings may be obtained. Amounts of combined acid between about 0.5% and 20% of the polymer are usually sufficient, and for most purposes, a resin containing from 0.5% to 5% of combined carboxylic acid is satisfactory. Dibasic acids, such as maleic acid, are usually effective in smaller amounts than monobasic acids. The amount of the vinyl organic esters present in the copolymer, may vary from 5 to 15, 20, 30 or 40% by weight of the copolymer. The molecular weight of the resin as determined by Staudinger's method may vary from 5,000 to 30,000, or higher.

Resins of the foregoing types have previously been described in Patent No. 2,329,456 to W. E. Campbell, Jr. The improved adhesiveness of such resins is pointed out in this patent, and this has been ascribed to the presence of unreacted carboxyl groups in the resin. However, such modified resins are substantially no more compatible with waxes than are the unmodified copolymers of vinyl chloride with vinyl acetate which do not contain copolymerized maleic acid. Therefore, it might have been expected that this relative lack of compatibility between waxes and these copolymers of vinyl halides, vinyl organic esters and alpha-beta olefinic carboxylic acids, might have so reduced the adhesive power of compositions containing these resins and waxes that the same difficulties would be encountered as is the case with unmodified copolymers of vinyl chloride with acetate. Actually, however, the wax and modified copolymers, despite their incompatibility, cooperate to produce adherent, abrasion-resistant, and moisture-proof coatings of high gloss and chemical resistance without resort to the high baking temperatures previously thought necessary.

Over certain types of papers, particularly glassine, greaseproof and parchment papers, and those papers printed with inks having an oil base, the adhesion of coatings containing waxes and acid-modified copolymers is considerably superior to the adherence of wax-containing coatings based on the unmodified copolymers even though such latter coatings are baked at temperatures of 375° to 400° F. or higher.

Advantageously, copolymers of vinyl halides with vinyl esters of lower fatty acids, such as acetic, propionic, and butyric acids, may be included in the coating compositions. When so included, these resins contribute important properties of flexibility and chemical resistance to the coatings. Preferred resins of this type are copolymers of vinyl chloride with vinyl acetate, containing from 60 to 95% vinyl chloride, and having molecular weights from 5,000 to 25,000. When employed by themselves in wax-containing compositions for coating paper, it is necessary that these resins be baked at temperatures of 375° to 400° F., in order that a film of satisfactory strength, adherence and gloss, and freedom from tackiness is obtained. Surprisingly enough, however, these unmodified copolymer resins may be included in the compositions in relatively large amounts without causing lack of adhesion when the coatings are baked at the lower temperatures of 225° to 275° F. These unmodified copolymers may comprise 10, 20, 30, 40, 50, 60, or 70%, of the total resinous ingredients of the coating. Preferably, such unmodified copolymers are included in amounts about equal to the acid-modified copolymers, when the acid content of the latter resin is about 1% as maleic acid.

Improved moisture resistance and increased compatibility between the vinyl resins and the waxes can be secured by including polymerized terpene resins in the coating composition. The degree of polymerization of the terpene resins may vary, so that liquid products are obtained, or hard, brittle resins melting at 257° F. These terpene resins are compatible with the waxes, and are reasonably compatible in small amounts with both the acid-modified and unmodified copolymer vinyl resins. Such hydrocarbon resins may be employed in amounts of from about 5 to 25% by weight of the total vinyl resins employed in the coating. Less desirably, other blending resins may be employed in the coatings, such as n-butyl methacrylate resin, ester gum, and ester gums modified with maleic acid.

Suitable waxes for use in the invention include paraffin wax, ceresin wax, Japan wax, or spermaceti wax. Particularly desirable are highly refiner paraffin waxes melting at 165° to 170° F. The proportion of wax employed may be varied from 1% to over 50% of the vinyl resins. Preferred amounts of wax are about 10 to 25% by weight of the vinyl resins. However, considerable improvement in the moisture resistance of the coating can be obtained by the inclusion of as little as 1% of the wax.

Several methods of applying the waxes and vinyl resin to the paper have been developed. One method involves dispersing the resin and wax in a hot solvent, such as any of the known ketone solvents or a mixture of ketones and aromatic hydrocarbons, at a temperature above the melting point of the wax, and then applying the hot lacquer to the paper. This method requires some alteration of the usual roller coating machine utilized in coating paper, in that means for heating the feed trough and the rollers must be provided. However, very uniform coatings may be deposited from the hot lacquers.

Alternatively, the wax and vinyl resin may be dispersed in a hot solvent, and then allowed to cool with strong agitation so that the wax settles out in finely-divided particles, and graininess of the solution is minimized. The presence of the terpene resins also increases the flow-out characteristics of the lacquer.

Still another method of incorporating the wax is to prepare an emulsion of the wax with water, and then combine this emulsion with a vinyl resin gel emulsion of the type described in Patent No. 2,319,852 to A. K. Doolittle. The emulsions do not coalesce on mixing, and smooth, continuous films of wax and vinyl resins are deposited from such emulsions.

A plurality of coatings may be applied to the paper, and, in such event, the base coating may contain the wax and a copolymer of vinyl chloride, vinyl organic ester, and alpha, beta-olefinic carboxylic acid, and the second coating may consist of a copolymer containing only the vinyl chloride and vinyl organic ester.

The coating compositions are particularly useful to moistureproof papers of a more or less impervious type, such as glassine, parchment, or regenerated cellulose sheeting, intended for use in packaging food products, such as butter, cheese, lard, processed meats and the like. The edges of such paper may be joined by heat-sealing, without interference from the waxes present. Also the coatings are chemically inert, tasteless, odorless, non-toxic, and resistant to grease and oils, which are important considerations in a wrapping for food products. The paper may also be hard-textured and bear upon its surface designs and lettering in suitable printing inks which contain natural or synthetic resins, together with drying oils, pigments and dyes. Where coatings of high transparency and gloss are desired, the proportions of wax should desirably be kept below about 10% of the vinyl resins, and 1% of the wax is frequently sufficient. In addition to its use as a food wrapper, the coated paper may be stamped into discs to serve as liners for bottle caps and other closures. Also the coated paper may be employed to wrap metal parts to prevent rusting in storage, by reason of its ability to be heat-sealed and to resist moisture. In addition, linings for paper and cardboard containers, coatings for wood pulp products, and coatings for laminated articles of paper are included within the scope of the invention.

Also, the primer coating may comprise a copolymer of vinyl chloride, vinyl acetate, and an alpha, beta-olefinic carboxylic acid, alone or in combination with unmodified copolymers of vinyl chloride and vinyl acetate. The top coating in such instance may comprise an unmodified copolymer of vinyl chloride and vinyl acetate blended with about 1% to 20% of wax. Either the primer or top coating, or both, may contain pigments, blending resins, or plasticizers, such as di(butoxyethyl) phthalate. This type of coating, in which the wax is in the top coating, is of particular advantage when applied over unfilled kraft paper, and similar porous papers, since the formation of unsightly wax stains is avoided. The primer coat also serves to coat, agglomerate, or smooth down the individual fibers of the paper, and prevents them from penetrating the top coating. If such penetration does occur, the protruding fibers act as wicks and detract from the moisture resistance of the coated paper.

The examples to follow will illustrate several embodiments of the invention:

Example 1

A lacquer was prepared having the following composition:

| | Per cent |
|---|---|
| Copolymer of vinyl chloride 87%, vinyl acetate 13% | 14 |
| Copolymer of vinyl chloride 86%, vinyl acetate 13%, maleic acid 1% | 14 |
| Methoxy ethyl acetyl ricinoleate | 3.5 |
| Tricresyl phosphate | 3.5 |
| Dibutyl phthalate | 1.0 |
| Spermaceti wax | 0.3 |
| Phenyl salicylate (light stabilizer) | 0.3 |
| Methyl ethyl ketone | 24.4 |
| Methyl isobutyl ketone | 24.4 |
| Toluene | 14.6 |
| | 100.0 |

Films of this solution were cast onto a sheet of supercalendered kraft paper, which contained a printed design which had been imparted by the letter-press type of printing press. The paper coating machine was adjusted so that a coating 0.3 to 0.4 mil in thickness was obtained. The coating was baked for 20 seconds at 250° F., followed by a bake of 10 seconds at 400° F. The effect of the high temperature baking was merely to increase the gloss of the coating somewhat as it was already adherent after the baking operation carried out at 250° F. A highly flexible, glossy coating was obtained which had excellent resistance to abrasion and scuffing; resistance to moisture, as well as to the action of acids, alkalies, and atmospheric oxygen; together with freedom from taste, odor and color.

Example 2

A paper coating lacquer was prepared of the following composition:

| | Parts by weight |
|---|---|
| Copolymer of vinyl chloride 86%, vinyl acetate 13%, maleic acid 1% | 30 |
| Butyl phthalyl butyl glycollate | 6 |
| Terpene resin melting at about 239° F | 7.5 |
| Paraffin wax, melting point 165°–170° F | 9 |
| Methyl ethyl ketone | 24.5 |
| Methyl isobutyl ketone | 24.5 |
| Toluene | 37.5 |

This solution was warmed to 122° F. and then applied to glassine paper, and, after evaporation of the solvents, a film of resin having a thickness of 0.5 mil was deposited. The coating was then baked as in Example 1. An adherent, flexible, clear and glossy coating resulted. The moisture vapor transmission rate of this paper was determined at 35° C., tested with air at 100% relative humidity on one side, and 0% on the other. The rate was 0.04 milligram of moisture vapor transmitted per square centimeter per hour. A similar coating without the wax showed a loss of 0.32 milligram per square centimeter per hour. A similar coating but without the terpene resin transmitted moisture at the rate of 0.07 milligram per square centimeter per hour.

The coatings may vary in thickness from about 0.2 mil to 2 mils in thickness, with consequent, but not proportionate, improvement in the degree of protection afforded. Consequently, thin coatings are usually entirely satisfactory.

Example 3

A lacquer of the following proportions was compounded:

| | Per cent |
|---|---|
| Copolymer of vinyl chloride 86%, vinyl acetate 13%, maleic acid 1% | 15 |
| Copolymer of vinyl chloride 87%, vinyl acetate 13% | 15 |
| Liquid terpene resin | 3 |
| Paraffin wax, melting point, 165° to 170° F | 6 |
| Methyl ethyl ketone | 21.4 |
| Methyl isobutyl ketone | 21.3 |
| Hydrogenated petroleum naphtha | 18.3 |
| | 100.0 |

After mixing the composition to disperse the resins, the dispersion was heated to 175° F. to melt the wax. The hot solution was then allowed to cool with vigorous agitation. A finely-divided solid suspension of the wax in the lacquer was obtained. This lacquer was applied by casting onto a sheet of glassine paper to form a film having a thickness when dry of 0.4 mil. The film was then baked for 30 seconds at 250° F. The resultant coated paper could be readily joined to itself by heat-sealing, and a strong bond existed between the coating and the glassine paper, indicating the suitability of lower baking temperatures. The moisture resistance of the coated paper was very good.

Example 4

A lacquer of the following composition was prepared:

| | Per cent |
|---|---|
| Copolymer of vinyl chloride 86%, vinyl acetate 13%, maleic acid 1% | 14 |
| Copolymer of vinyl chloride 87%, vinyl acetate 13% | 14 |
| Ester gum | 6 |
| High melting paraffin wax | 6 |
| Methyl ethyl ketone | 60 |
| | 100 |

This mixture was heated to about 137° F. and a clear and homogeneous solution was obtained. This solution was applied to paper at a temperature of about 122° to 140° F. and the coated paper was then baked at a temperature of 250° F. A smooth, adherent semi-lustrous coating of good resistance to moisture vapor was obtained.

Example 5

A lacquer was prepared as follows:

| | Per cent |
|---|---|
| Copolymer of vinyl chloride 86%, vinyl acetate 13%, maleic acid 1% | 15 |
| Copolymer of vinyl chloride 87%, vinyl acetate 13% | 15 |
| Refined paraffin wax, average melting point 150° F | 0.5 |
| Liquid terpene resin | 2.0 |
| Methyl ethyl ketone | 23.6 |
| Methyl isobutyl ketone | 23.6 |
| Hydrogenated petroleum naphtha | 20.3 |
| | 100.0 |

This mixture was heated to effect solution and the solution was applied while still warm to glassine paper. After evaporation of the solvents, a coating of about 0.5 mil in thickness was obtained. This coated paper was baked for 30 seconds at 250° F. The resultant coating showed high gloss, clarity and freedom from wax-blush, good adhesion, and excellent heat-sealing ability, coupled with good resistance to the transmission of moisture vapor.

We claim:

Process for coating paper which comprises dispersing a copolymer of vinyl chloride 86%, vinyl acetate 13%, maleic acid 1%, a copolymer of vinyl chloride 87% and vinyl acetate 13%, and a paraffin wax, in a mixture of methyl ethyl ketone, methyl isobutyl ketone and hydrogenated petroleum naphtha, the ratio of ketones to naphtha being about 2.3 to 1, the ratio of the two copolymers being 1 to 2 and 2 to 1, and the proportions of wax being from 10 to 25% of the two copolymers combined, heating the dispersion to a temperature above the melting point of the wax, cooling and agitating the dispersion to form a finely-divided solid suspension of the wax in the fluid resin dispersion, forming a thin wax-containing film of said copolymer on the surface of the paper, baking the paper at a temperature of 225° to 275° F., and forming an adherent, glossy, abrasion and moisture resistant coating on the paper.

GEORGE M. POWELL, III.
WILLIAM H. McKNIGHT.